No. 861,274. PATENTED JULY 30, 1907.
C. J. ENSRUD & C. K. STOCKLAND.
WHEELED BARN FORK.
APPLICATION FILED FEB. 5, 1906.
2 SHEETS—SHEET 1.
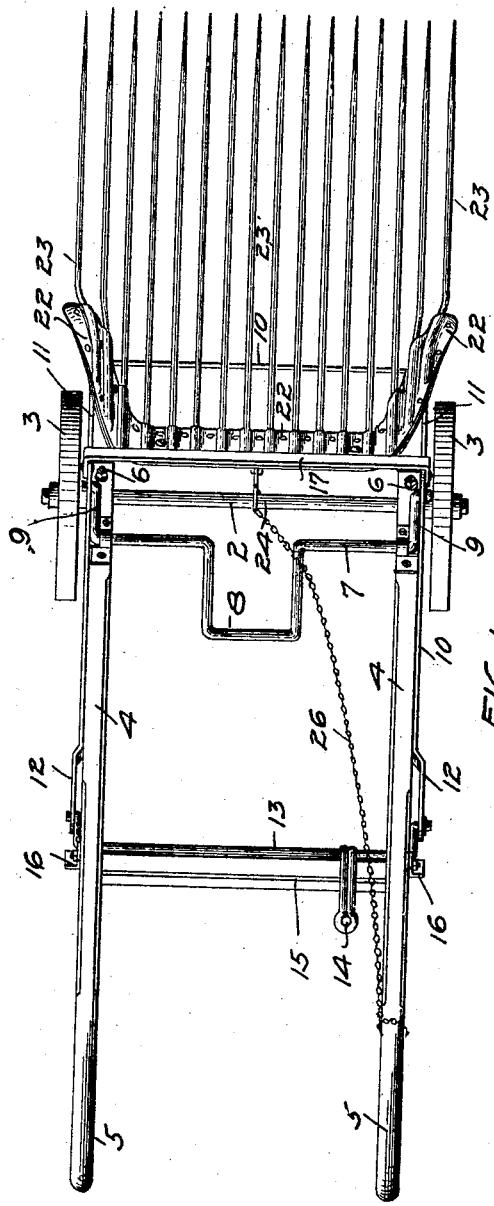
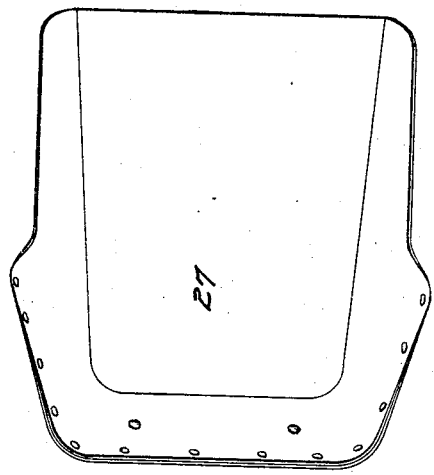
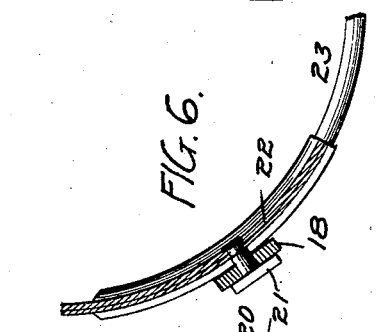
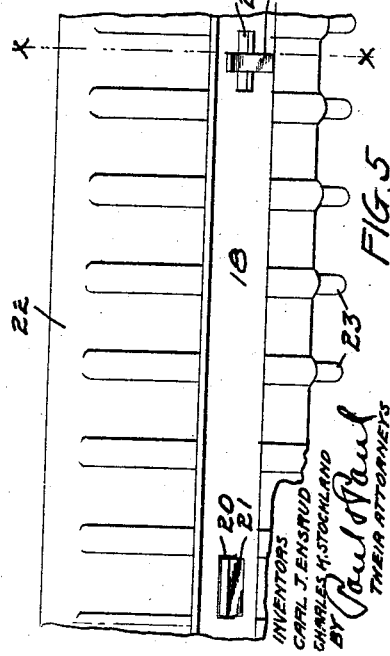

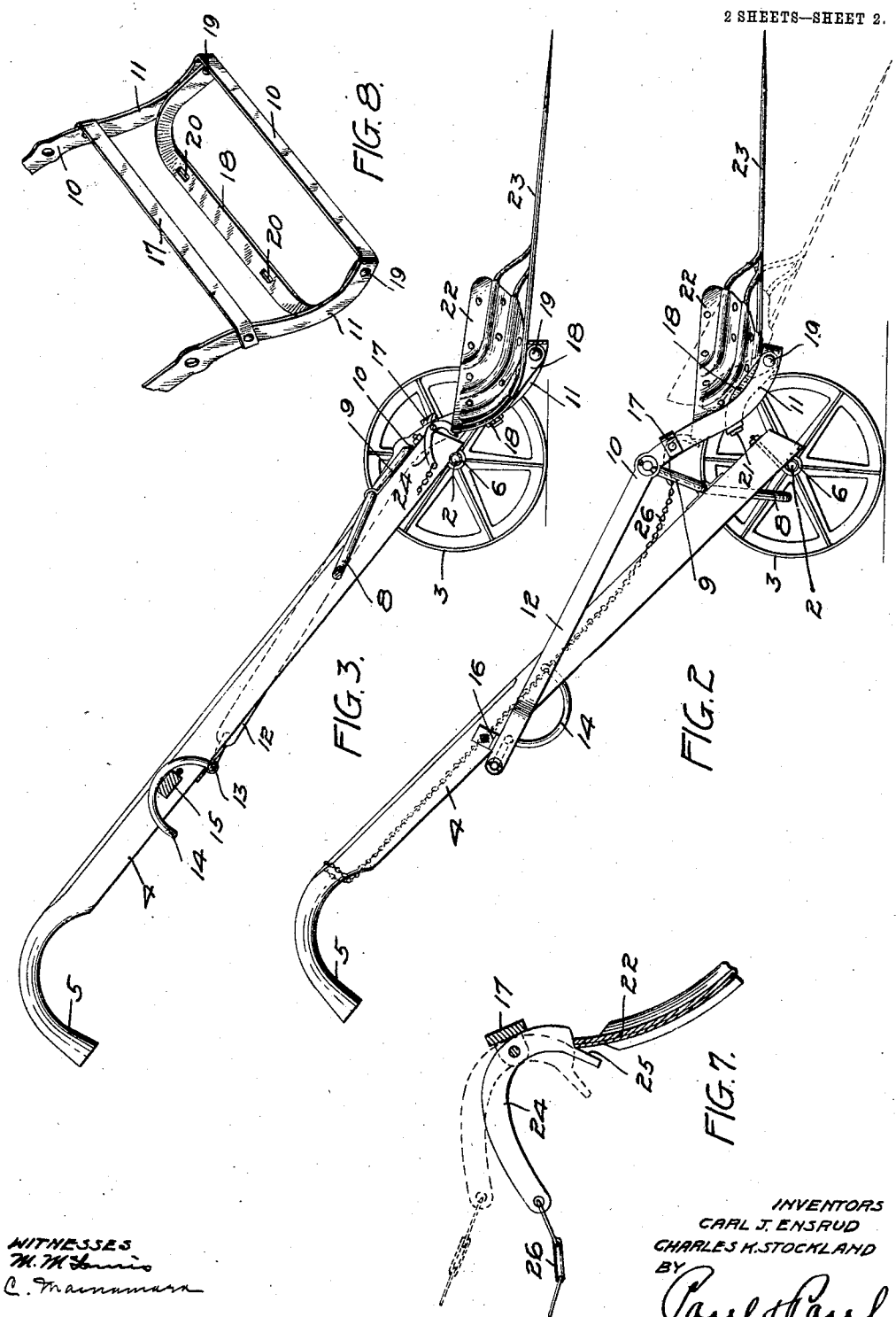

UNITED STATES PATENT OFFICE.

CARL J. ENSRUD AND CHARLES K. STOCKLAND, OF STEPHEN, MINNESOTA.

WHEELED BARN-FORK.

No. 861,274.  Specification of Letters Patent.  Patented July 30, 1907.

Application filed February 5, 1906. Serial No. 299,578.

*To all whom it may concern:*

Be it known that we, CARL J. ENSRUD and CHARLES K. STOCKLAND, both of Stephen, Marshall county, Minnesota, have invented certain new and useful Improvements in Wheeled Barn-Forks, of which the following is a specification.

The object of our invention is to provide a wheeled fork adapted for barn and yard use, and by means of which manure, dirt, hay, etc., can be quickly and conveniently moved from place to place.

A further object is to provide a wheeled implement of the character described adapted for use either with a fork or a scoop.

A further object is to provide a wheeled fork, of strong and durable construction, and one that can be easily operated, and of large capacity.

The invention consists, generally, in various constructions and combinations, all as hereinafter described and particularly pointed out in the claims.

In the accompanying drawings forming part of this specification, Figure 1 is a plan view of a wheeled fork embodying our invention. Fig. 2 is a side elevation of the same. Fig. 3 is a longitudinal vertical section. Fig. 4 is a plan view of the scoop. Fig. 5 is a bottom view of the fork bail showing the means for detachably securing the fork and scoop thereon. Fig. 6 is a sectional view on the line $x$—$x$ of Fig. 5. Fig. 7 is a detail sectional view of the latch device, by means of which the tilting of the fork or bail is controlled. Fig. 8 is a detail view showing the lower end of the bail and the pivoted yoke thereon.

In the drawing, 2 represents an axle having carrying wheels 3, whereon rails 4 having handles 5 at their upper ends are secured by any suitable means as straps 6. 7 is a crank shaft having an offset 8 near the middle, upon which the foot of the operator is placed when it is desired to raise the fork or scoop. The cranks 9, at the ends of said shaft, are pivotally connected with a bail 10, which has a downwardly turned forward portion 11, and rearwardly extending arms 12 pivotally connected to a second crank shaft 13, which is operated by means of a hand lever 14. A cross bar 15 connects the rails 4 and limits the movement of said lever, in one direction, and stops 16 mounted on the rails 4 engage the ends of the arms 12 and limit the movement of the bail in the other direction. When the operator places his foot on the offset 8, the crank shaft 7 will be rotated and the bail raised, and by swinging the lever 14 the bail will be drawn in or toward the operator until the load is directly above the wheels and axle, as will hereinafter appear. A cross bar 17 connects the arms 12 near the crank shaft 7, and a yoke 18 has its ends pivoted at 19 in the lower end of the bail, and is provided with slots 20 to receive T shaped heads 21 swiveled on the bottom of the fork head 22. The heads 21 are inserted into the slots and then turned a quarter of a revolution until they are crosswise of the slots 20 and locked therein. Whenever desired, the heads 21 are revolved to register with the slots, and then the fork can be disengaged from the bail. The fork head is rounded on the under side, as indicated in Figs. 1, 2 and 3, and the yoke 18 is suitably curved to fit the fork head. Normally, the fork will be supported in the position indicated in full lines in Fig. 2 with the tines 23 raised out of contact with the ground. Whenever desired, however, the fork is allowed to swing down until the tines or teeth contact with the ground and allow the convenient discharge of the load. A latch 24 is preferably pivoted on the cross bar 17, and provided with a notched lower end 25 which engages the rear edge of the fork head and locks it in its horizontal position. A chain 26 extends from the latch back to one of the handles to enable the operator to trip the latch and dump the fork.

The loading position is shown in Fig. 3, where the fork is shown with the tines resting upon the ground in position to gather up material as the implement is pushed along. As soon as the fork is loaded the operator will rock the shaft 7 and lift the bail and the fork up from the ground, and then rock the shaft 13 and draw the bail and the loaded fork back to a point over the axle, where the load will be carried almost entirely by the wheels and the operator will only be required to push the implement to the point where it is desired to dump the contents of the fork. At that point the latch will be tripped and the fork will tilt to the position shown in Fig. 2.

In place of the fork with a series of tines or teeth we may provide a scoop or shovel 27 having a head somewhat similar to the one provided for the fork, and secured to the bail 18 in the same manner. The operation of the device with the scoop will be substantially the same as when the fork is employed. The end 10 of the bail may be used as a scraper for the purpose of gathering up chaff, fine dirt, or manure in the yard or on the barn floor.

We claim as our invention:

1. The combination with the rails having handles at their upper ends and an axle and carrying wheels at their lower ends, of a crank shaft mounted on said rails, a bail pivoted on the crank of said shaft and adapted to be raised and lowered by the rocking of said shaft, a second crank shaft having its crank connected with said bail and having an operating lever and a gathering device mounted on said bail, substantially as described.

2. The combination with the side rails having carrying wheels, at their lower ends and handles at their upper ends of a bail mounted thereon, a rocking crank shaft having its crank pivotally connected with said bail and adapted to be oscillated to raise or lower said bail, a lever near said handles and connected with said bail for operating the same and a gathering device pivotally supported on said bail, substantially as described.

3. The combination with the side rails having carrying wheels, of a crank shaft mounted on said rails and having an offset to receive the foot of the operator, a bail pivoted on the crank of said shaft and adapted to be raised and lowered by the rocking of said shaft, and a gathering fork mounted on said bail.

5. A barn fork comprising side rails having an axle and carrying wheels at their lower ends and handles at their upper ends, a crank shaft mounted in said rails near said axle, a bail mounted on the crank of said shaft and extending upwardly along said rails toward said handles and having an operating means at its upper end and a gathering fork pivotally supported on the lower end of said bail, substantially as described.

5. A barn fork comprising side rails having an axle and carrying wheels at their lower ends and handles at their upper ends, a crank shaft mounted on said rails near said axle, a bail pivoted at a point intermediate to its ends on the crank of said shaft, a gathering fork mounted on the lower end of said bail and means within reach of the operator at said handles for oscillating said crank shaft and throwing said bail and fork forward to a gathering position or raising and swinging the same backward to a point over said axle, substantially as described.

6. In a barn fork, the combination with a frame having handles at its upper end and an axle and carrying wheels at its lower end, of a bail pivoted on said frame and comprising a downwardly turned forward portion 11 and rearwardly extending arms 12, a yoke 18 pivoted in said downwardly turned portion, a gathering fork mounted in said yoke, means for locking said fork against premature tilting and means near said handles for tilting said bail on its pivots and other means for releasing said fork, substantially as described.

7. A barn fork comprising a frame having an axle and carrying wheels at its lower end, and operating handles at its upper end, a crank shaft mounted in said frame, a bail mounted on the crank of said shaft and comprising a lower portion 11 and rearwardly extending arms 12, and the gathering fork mounted on the lower portion of said bail means near said handles for tilting said bail to throw said gathering fork forward or withdraw it to a position above said axle, substantially as described.

8. The combination, with the side rails having an axle and carrying wheels at their lower ends and handles at their upper ends, of a bail mounted on said frame and having its lower portion normally projecting beyond said axle, a gathering fork carried by the lower portion of said bail, and means for projecting said bail forward to carry the fork to its gathering position, or withdrawing it to its loaded position above said axle, substantially as described.

9. The combination, with a frame having an axle and carrying wheels at its lower end, and handles to be grasped by the operator of a bail pivotally mounted on said frame, a gathering fork carried by said bail and means located near said handles for swinging said bail forward to carry the fork to its gathering position or withdrawing the bail to return the fork to its loaded position above said axle, substantially as described.

In witness whereof, we have hereunto set our hands this 17th day of January 1906.

CARL J. ENSRUD.
CHARLES K. STOCKLAND.

Witnesses:
 BEN STOKKE,
 WM. MERDINK.